United States Patent [19]

Day

[11] 4,056,214
[45] Nov. 1, 1977

[54] EASY EMPTY SEED HOPPER

[75] Inventor: Leon E. Day, West Memphis, Ark.

[73] Assignees: George G. Watts; Jeff D. Pratt, both of Memphis, Tenn.

[21] Appl. No.: 674,386

[22] Filed: Apr. 7, 1976

[51] Int. Cl.² ............................................. A01C 15/00
[52] U.S. Cl. ..................................... 222/608; 222/483; 222/561
[58] Field of Search ............................. 222/176–178, 222/559–561, 478, 481, 482–486, 495–497; 221/264, 281; 111/77, 78; 220/255

[56] References Cited

U.S. PATENT DOCUMENTS

| 1,109,731 | 9/1914 | Worthington | 222/177 |
| 1,630,538 | 5/1927 | Micallef | 222/561 |
| 2,844,288 | 7/1958 | Crowley | 222/559 |

Primary Examiner—Robert B. Reeves
Assistant Examiner—H. Grant Skaggs

Attorney, Agent, or Firm—Baldwin, Egan, Walling & Fetzer

[57] ABSTRACT

The invention discloses a seed holding hopper or the like, which is mounted in vertical position on a planter vehicle. The hopper is cylindrical, closed at the top by a lid or cover, and closed at the bottom by a bottom member which has the usual seed exit opening through it. A clean-out opening is provided in the cylindrical wall of the hopper close to the bottom and a closure member is mounted on the inside of the hopper, conforming in shape to the cylinder portion of the hopper with guides holding the closure member close to the adjacent wall of the hopper and slidable vertically downward to close the clean-out opening and upwardly to clear the opening so that one may clean out any seed left in the hopper. The closure member, in open position, extends out through the top of the hopper and must be safely in the closed position for the lid or cover of the hopper to be placed in its usual position closing the hopper.

4 Claims, 5 Drawing Figures

EASY EMPTY SEED HOPPER

BACKGROUND OF THE INVENTION

Planters today carry a hopper in the vertical position for feeding seed material through a seed distributing apparatus to plant the seed in rows in the soil. To clean out the seed remaining in the hopper at the end of a planting operation, it is customary to release one side of the bottom of the hopper and turn the same over so that the hopper is lying in the horizontal direction, after which one scrapes out the seed to clean the hopper. In doing this, it is practically impossible to avoid spilling seed on the ground through the usual seed-exit opening in the bottom of the hopper. The operator may seek to close such opening with one hand while manipulating the hopper with the other hand, but this is ineffectual.

The object of the present invention is to provide a seed clean-out opening through the cylindrical wall of the hopper next to the bottom, together with a closure member for this clean-out opening having an outer surface complementary to the inner face of the hopper cylinder and having opposite parallel edges, with guide means fixed in the hopper engaging the parallel edges of the closure member and holding the same close to the hopper cylindrical wall while permitting sliding movement of the closure member along the hopper axially. This closure member is of a length to engage the bottom and close the seed clean-out opening only when its upper end opposite the clean-out opening is substantially touching the top, so that the top must be closed to indicate the clean-out opening is closed, and the closure member may be easily reciprocated away from the clean-out opening to remove seed from the hopper, at all times retaining the hopper in its vertical position.

Other objects and advantages of the invention will be apparent from the accompanying specification and drawings and the inventive features thereof will be set forth in the appended claims.

In the drawings,

FIG. 3 is a perspective view looking into the top of the hopper, with the lid or cover removed and showing the closure member in open position with respect to the seed clean-out hole; while

Figure 1:
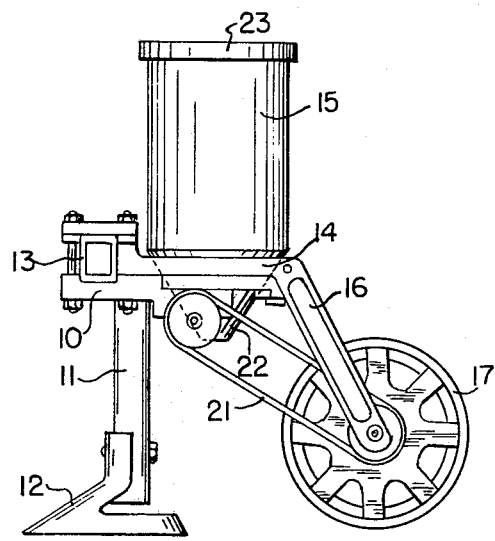
FIG. 1 is a side elevation of the hopper mounted in vertical position on a traveling vehicle such as a planter.

A traveling planter is shown in FIG. 1 adapted to be driven by means of a tractor. The planter has a frame 10 supporting a vertical post 11 on the bottom of which is a plow blade 12 to open the soil to receive the seed. The planter frame is mounted on a tool bar 13 and provides a support 14 for the hopper 15, and downwardly extending supports 16 which rotatably support a packer wheel 17.

Figure 2:
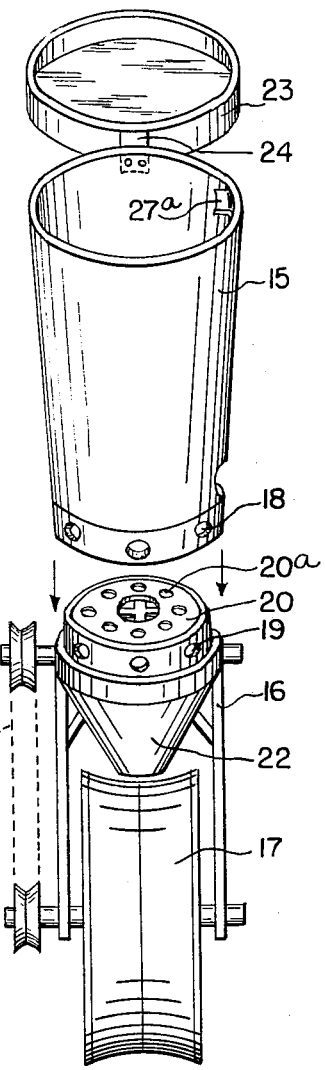
FIG. 2 is an exploded view taken from the right-hand side of FIG. 1 and showing the hopper dismounted from the seed distributing apparatus above the packer wheel.

The structure is more clearly seen in FIG. 2 where the frame 16 and the packer wheel 17 are clearly shown and the hopper 15 is bolted through the openings 18 and 19 to a known seed distributor structure at 20 which is rotated by means of the belt 21 which causes the openings 20a to receive one or more seeds from the hopper and to drop them through a single opening (not shown) at a fixed location beneath 20 so as to pass seed from an opening 20a through a conical passageway 22 ahead of the packer wheel 17 and thence into the adjacent row in the soil. Normally a flexible tube will be connected from cone 22 down to the furrow. Obviously seeds will not be dropped by distributor 20 except when the device is rotated by belt 21 causing openings 20a to rotate.

Figure 3:
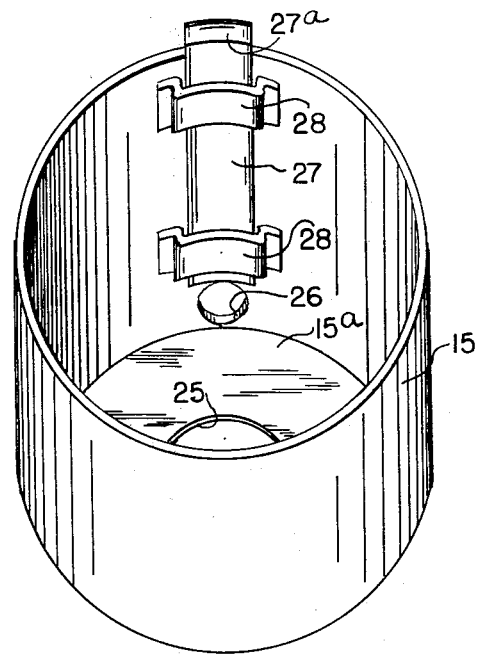
Figure 4:
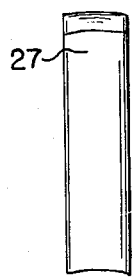
FIGS. 4 and 5 are respectively front elevation and side perspective views of the closure member of FIG. 3.
Figure 5:
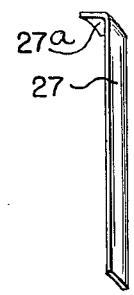

The hopper 15 is closed at the top by means of a lid or cover 23 which is usually connected to the hopper by a hinge structure 24. The bottom of the hopper as seen at 15a in FIG. 3 has a seed exit opening 25 which was referred to above. In using the seed containing hopper, there is usually a quantity of seed left inside the container 15 which must be removed. The present invention provides a small opening 26 through the cylindrical wall of the hopper next to the bottom 15a and a slidable closure member 27 is provided to slide up and down to open and close the seed clean out opening 26. The closure member 27 is clearly seen in FIGS. 4 and 5 and comprises a long blade curved to conform to the inner wall of the cylindrical hopper 15 and guided by the brackets 28 which are welded to the inner wall of the hopper and are so arranged that they hold the closure member snugly against the inner surface of the hopper 15. The closure member has an inwardly turned handle 27a at its upper end for manipulation of the closure member. The closure member is of such a length that when the seed clean-out opening 24 is open as shown in FIG. 3, the closure member 27 extends out the open top of the hopper 15. However, when the closure member is in its down and closed position, the closure member just fits inside of the hopper 15 practically touching the top 23 when the same is put in its closed position. This means that the operator of the device is made aware that seed might escape out the opening 26 unless the closure member is fully in its down position with the top 23 fully closed.

In the use of this invention with the hopper 15 mounted on the traveling planter vehicle as shown in FIG. 1, the top 23 is opened and the desired amount of seed is placed in the hopper 15, after which the lid is closed, it being understood that the closure member is in its down position at this time. After planting all of the seed desired, the traveling machine is stopped, the hopper 15 remains in its vertical position, and the closure member is raised as shown in FIG. 3 allowing the excess seed to run out the opening 26 into a suitable container. A small amount of seed will remain on the far side of the bottom 15a but this is easily swept manually out through the opening 26. Thus, the present invention saves the time and activity necessary formerly to loosen one side of the hopper 15 and turn the same about 90° spilling seed on the ground, these disadvantages now being overcome by the present invention.

This invention may also be used to empty a hopper holding finely divided fertilizer.

What is claimed is:

1. In combination a planter vehicle, an elongated seed hopper mounted in a vertical position on said vehicle, said hopper being cylindrical and having a removable and closable top and a bottom closed except for a seed-exit opening, there being a seed distributor on said vehicle positioned under said seed-exit opening, said hopper being otherwise imperforate, there being a small seed-clean-out opening through the cylindrical wall of said hopper next to said bottom, a closure member for said clean-out opening having an outer surface complementary to the inner face of said hopper cylinder and having opposite parallel edges, bracket means fixed in said hopper holding said closure member close to said hopper cylindrical wall while permitting sliding movement of said closure member along said hopper and axially thereof, said closure member being of a length to engage said bottom and to close said seed-clean-out opening only when its upper end opposite said clean-out opening is substantially touching said top closed, whereby said top must be closed to indicate said clean-out opening is closed and said closure member may be easily reciprocated away from said clean-out opening to remove seed from said hopper when the latter is in a vertical position.

2. A combination as defined in claim 1, wherein said closure member has a handle at its upper end extending inwardly of said hopper.

3. An elongated seed hopper, said hopper being cylindrical and having a removable and closable top and a bottom closed except for a seed-exit opening, said hopper being otherwise imperforate, there being a small seed-clean-out opening through the cylindrical wall of said hopper next to said bottom, a closure member for said clean-out opening having an outer surface complementary to the inner face of said hopper cylinder and having opposite parallel edges, bracket means fixed in said hopper holding said closure member close to said hopper cylindrical wall while permitting sliding movement of said closure member along said hopper and axially thereof, said closure member being of a length to engage said bottom and to close said seed-clean-out opening only when its upper end opposite said clean-out opening is substantially touching said closed top, whereby said top must be closed to indicate said clean-out opening is closed and said closure member may be easily reciprocated away from said clean-out opening to remove seed from said hopper when the latter is in a vertical position.

4. A combination as defined in claim 3, wherein said closure member has a handle at its upper end extending inwardly of said hopper.

* * * * *